US009104566B2

(12) United States Patent
Sutterfield et al.

(10) Patent No.: US 9,104,566 B2
(45) Date of Patent: Aug. 11, 2015

(54) SYSTEM AND METHOD FOR DETERMINING WHETHER A FAILED COMMUNICATION BETWEEN SIGNAL TRANSFER POINTS WAS IN ERROR

(75) Inventors: Terri L. Sutterfield, Farmersville, TX (US); Shu-Yi S. Cherng, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1348 days.

(21) Appl. No.: 12/604,865

(22) Filed: Oct. 23, 2009

(65) Prior Publication Data

US 2011/0099434 A1 Apr. 28, 2011

(51) Int. Cl.
*G06F 11/07* (2006.01)

(52) U.S. Cl.
CPC ........ *G06F 11/0751* (2013.01); *G06F 11/0709* (2013.01)

(58) Field of Classification Search
USPC .................................. 709/238; 714/48; 726/4
See application file for complete search history.

(56) References Cited

U.S. PATENT DOCUMENTS

| | | | | |
|---|---|---|---|---|
| 5,610,974 | A * | 3/1997 | Lantto | 455/433 |
| 5,925,127 | A * | 7/1999 | Ahmad | 726/31 |
| 6,084,870 | A * | 7/2000 | Wooten et al. | 370/349 |
| 6,119,101 | A * | 9/2000 | Peckover | 705/7.31 |
| 6,130,937 | A * | 10/2000 | Fotta | 379/200 |
| 6,990,347 | B2 * | 1/2006 | McCann | 455/445 |
| 7,305,454 | B2 * | 12/2007 | Reese et al. | 709/217 |
| 2001/0046856 | A1 * | 11/2001 | McCann | 455/423 |

* cited by examiner

*Primary Examiner* — Ranodhi Serrao

(57) ABSTRACT

An exemplary system includes a first signal transfer point configured to communicate with a second signal transfer point via a communication network. The first signal transfer point is configured to generate an error message in response to receiving an unauthorized signal from the second signal transfer point. A monitoring system is in communication with the first signal transfer point. An order system is in communication with the monitoring system and is configured to store orders authorizing communication between the first signal transfer point and the second signal transfer point. The monitoring system is configured to receive the error message generated by the first signal transfer point and query the order system to determine whether an order authorizing the communication between the first signal transfer point and the second signal transfer point exists.

20 Claims, 4 Drawing Sheets

SYSTEM AND METHOD FOR DETERMINING WHETHER A FAILED COMMUNICATION BETWEEN SIGNAL TRANSFER POINTS WAS IN ERROR

BACKGROUND

Signaling protocols allow a service provider to lease network resources from one or more carriers. Whether the service provider is authorized to use the carrier's network resources is defined by various orders. Specifically, the orders define the manner in which the service provider may use the resources, as well as how the service provider will be billed for using the resources. However, the service provider may still be denied access to the carrier's network resources even if an order exists. For example, processing orders takes time. The service provider may begin using the carrier's resources before the order is processed, causing the connection to the carrier's network resources to fail or for the service provider to be billed improperly by the carrier. A similar issue may arise if the order is processed, but includes an error. Without an order authorizing the service provider to use the carrier's network resources, the communication fails. Accordingly, a system is needed that determines whether the failed communication was in error.

DETAILED DESCRIPTION

An exemplary system includes a first signal transfer point configured to communicate with a second signal transfer point via a communication network. The first signal transfer point may be configured to generate an error message in response to receiving an unauthorized signal from the second signal transfer point. A monitoring system may be in communication with the first signal transfer point. An order system may be in communication with the monitoring system and configured to store orders authorizing communication between the first signal transfer point and the second signal transfer point. The monitoring system may be configured to receive the error message generated by the first signal transfer point and query the order system to determine whether an order authorizing the communication between the first signal transfer point and the second signal transfer point exists.

The exemplary system may implement various methods. One exemplary method may include receiving a message at a first signal transfer point from a second signal transfer point, determining whether communication between the first signal transfer point and the second signal transfer point is authorized, generating an error message at the first signal transfer point if the communication with the second signal transfer point is unauthorized, receiving the error message from the first signal transfer point, and determining whether an order authorizing communication between the first signal transfer point and the second signal transfer point is stored in an order system.

Moreover, the monitoring system may be configured to receive an error message indicating an unauthorized communication between the first signal transfer point and the second signal transfer point, and to query the order system for orders that correspond to the error message and to authorize communication between the first signal transfer point and the second signal transfer point.

Figure 1:
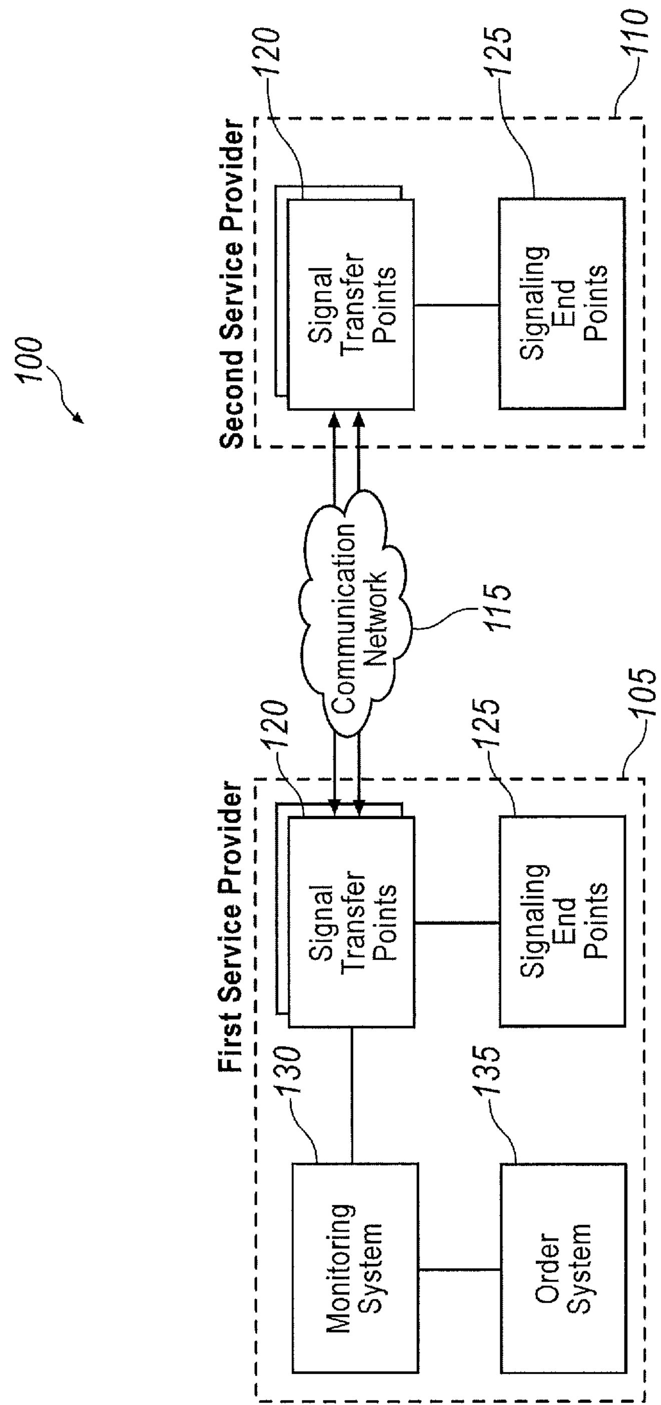
FIG. 1 illustrates an exemplary system having a monitoring system configured to determine whether failed communication between signal transfer points was in error.

FIG. 1 illustrates an exemplary system 100 for determining whether failed communication between two or more signal transfer points was in error. System 100 may take many different forms and include multiple and/or alternate components and facilities. While an exemplary system 100 is shown in FIG. 1, the exemplary components illustrated in Figure are not intended to be limiting. Indeed, alternative components (e.g., greater or fewer components) and/or implementations may be used.

As illustrated in FIG. 1, system 100 includes a first service provider network 105 in communication with a second service provider network 110 over a communication network 115. The first and second service provider's networks 105, 110 include one or more signal transfer points 120. Each of the signal transfer points 120 may be in communication with one or more signaling end points 125. Moreover, the first service provider's network 105 may include a monitoring system 130 in communication with the signaling end points 125 of the first network provider and an order system 135.

The signal transfer points 120 of the first service provider network 105 and the second service provider network 110 may include a router that relays messages between other signal transfer points 120 and the signaling end points 125. For example, the signal transfer points 120 may be implemented in a signaling system number 7 (SS7) protocol. The signal transfer points 120 may be connected to one another as well as other signal transfer points 120 via signaling links, which are described in greater detail with respect to FIG. 2.

In the exemplary approach, each signal transfer point 120 includes a unique point code that may be used to distinguish signal transfer points 120 from one another. For example, the point code may serve as a unique address, allowing the point code to be used to identify the originating signal transfer point 120 and destination signal transfer point 120. For example, a message may include an originating point code indicating the signal transfer point 120 from which the message originated and a destination point code indicating the signal transfer point 120 to which the message is being transmitted.

One or more of the signal transfer points 120 may be configured to generate an error message when communication with another signal transfer point 120 is unauthorized. For example, one of the signal transfer points 120 of the first service provider network 105 may receive a message from one of the signal transfer points 120 of the second service provider network 110. If this type of communication is not authorized, the signal transfer point 120 of the first service provider network 105 may be configured to generate an error message indicating that the communication is unauthorized. The error message may include the point code of the originating signal transfer point (e.g., the signal transfer point 120 of the second service provider network 110) and the point code of the destination signal transfer point (e.g., the signal transfer point 120 of the first service provider 105).

The signaling end points 125 may include service control points, service switching points, or both. A service control point may be used to control service. For example, the service control point may query a service data point or another node that is configured to provide subscriber information to identify the end point (e.g., geographical number) to which a call is to be routed. A service switching point may be configured to query the service control point to handle a call.

The monitoring system 130 may be in communication with one or more of the signal transfer points 120 of at least one of the service provider networks 105, 110. As illustrated in FIG. 1, the monitoring system 130 is in communication with the signal transfer points 120 of the first service provider network 105. However, the monitoring system 130 may also be in communication with the signal transfer points 120 of the second service provider network 110, or another monitoring system 130 may be in communication with one or more of the signal transfer points 120 of the second service provider network 110.

The monitoring system 130 may be configured to receive the error messages generated by one or more of the signal transfer points 120. For example, the monitoring system 130 may be configured to query one or more of the signal transfer points 120 for the error messages at predetermined intervals (e.g., once a day) and download the error messages as a batch. Alternatively, one or more of the signal transfer points 120 may be configured to automatically transmit the error messages to the monitoring system 130 in a batch at a predetermined time or as they are generated. Furthermore, the monitoring system 130 may be configured to receive the error messages upon instructions received from a user. For example, the user may instruct the monitoring system 130 to pull the error messages from the signal transfer point 120, or the user may instruct the signal transfer point 120 to transmit the error messages to the monitoring system 130.

The order system 135 may be in communication with the monitoring system 130 and store orders that authorize communication between various signal transfer points 120, including pending orders, processed orders, or both. For example, the monitoring system 130 may be configured to query the order system 135 to determine whether the error message by the signal transfer point 120 was generated in error. The order system 135 may be configured to receive the query from the monitoring system 130 and transmit a copy of any orders matching the query to the monitoring system 130.

The order system 135 may include any number of subsystems or databases storing information, including the pending orders, the processed orders, or both. In one exemplary approach, the order system 135 may receive pending orders as they are generated or in batches. The order system 135 may be configured to process the pending orders at predetermined intervals (e.g., once per day) or upon instructions from a user. Once the orders are processed, the signal transfer points 120 may be configured to allow communication as defined by the processed order. Alternatively, the signal transfer point 120 may be configured to access the processed orders to determine whether communication between signaling end points 125 is allowed.

Various elements of the system 100 such as the monitoring system 130 and the order system 135 may include computing systems and/or devices that may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The monitoring system 130 and the order system 135 may be in communication with one or more databases, data repositories, or other data stores. Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, elements of system 100 may be implemented as computer-readable instructions (e.g., software) on one or more computing devices (e.g., servers, personal computers, etc.), stored on computer readable media associated therewith (e.g., disks, memories, etc.).

Figure 2:
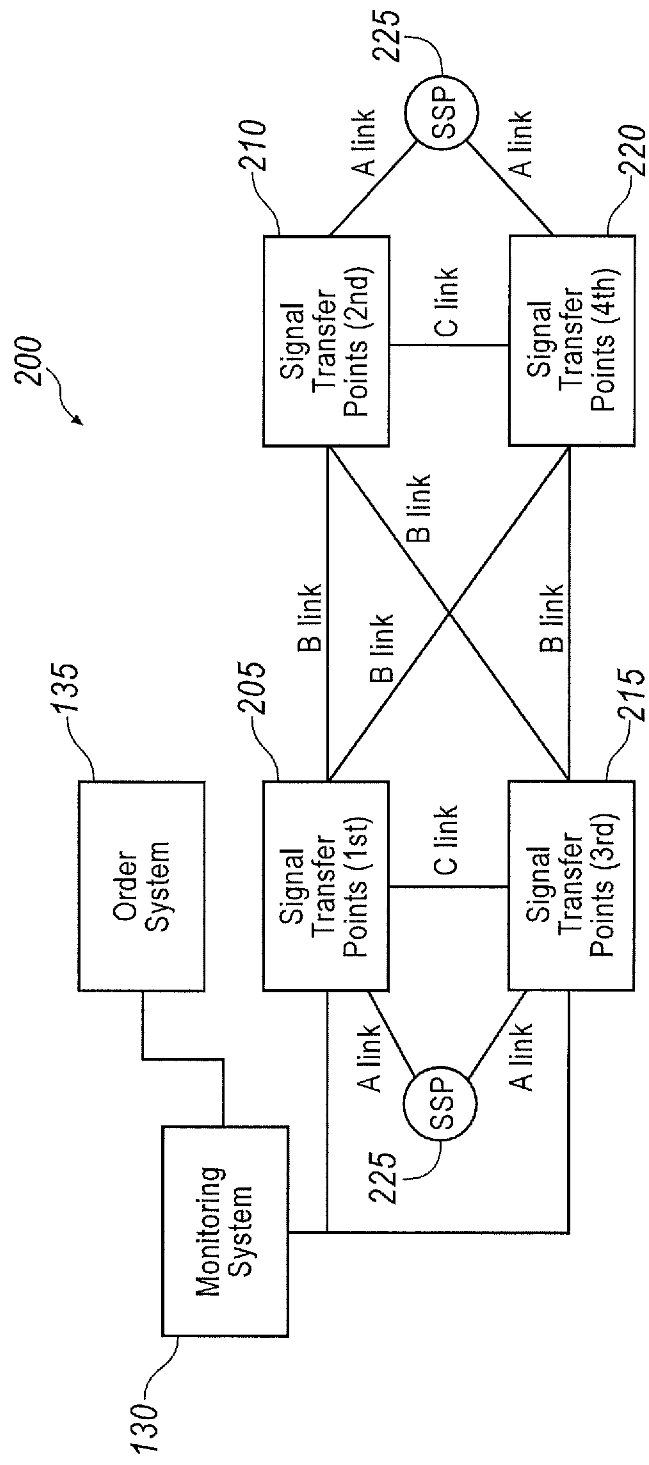
FIG. 2 illustrates an exemplary implementation of the system of FIG. 1.

FIG. 2 illustrates an exemplary implementation of the monitoring system 130 in a system 200 implementing a signaling system number 7 (SS7) protocol. The system of FIG. 2 includes a first signal transfer point 205 in communication with a second signal transfer point 210. As illustrated, the first signal transfer point 205 is part of the first service provider network 105 and the second signal transfer point 210 is part of the second service provider network 110. Alternatively, each signal transfer point 205, 210, 215, 220 may be part of the same network (e.g., the first service provider network 105).

The first signal transfer point 205 and the second signal transfer point 210 may be paired with other signal transfer points 215, 220 to provide redundancy. For example, as illustrated in FIG. 2, the first signal transfer point 205 is paired with a third signal transfer point 215 and the second signal transfer point 210 is paired with a fourth signal transfer point 220. One or both of the first signal transfer point 205 and second signal transfer point 210 may be paired with additional signal transfer points 120 than illustrated in FIG. 2.

The signal transfer points 120 are in communication with one another via several links. For example, bridge links (e.g., "B links") may be used to connect the first and third signal transfer points 205, 215 to the second and fourth signal transfer points 210, 220. The exemplary illustration of FIG. 2 includes four B links Cross links (e.g., "C links") may be used to connect the first signal transfer point 205 to the third signal transfer point 215 and to connect the second signal transfer point 210 to the fourth signal transfer point 220. FIG. 2 illustrates two C links. Access links (e.g., "A links") may be used to connect each of the signal transfer points 205, 210, 215, 220 to the service switching points 225. FIG. 2 illustrates four A links.

The monitoring system 130 is in communication with the first and third signal transfer points 205, 215 and the order system 135. For example, the monitoring system 130 may be configured to receive the error messages generated by one or more of the signal transfer points (e.g., signal transfer points 205, 215 as illustrated in FIG. 2) and query the order system 135 for orders that correspond to the error messages generated. Although not illustrated in FIG. 2, the same or another monitoring system 130 may be in communication with the third and fourth signal transfer points 215, 220. For example, if the first, second, third, and fourth signal transfer point 205, 210, 215, 220 are part of the same service provider's network, then the same monitoring system 130 may be in communication with each of the signal transfer points 120. However, if the second and fourth signal transfer points 210, 220 are part of a different service provider's network, then a separate monitoring system 130 may be in communication with the second and fourth signal transfer points 210, 220.

Figure 3:
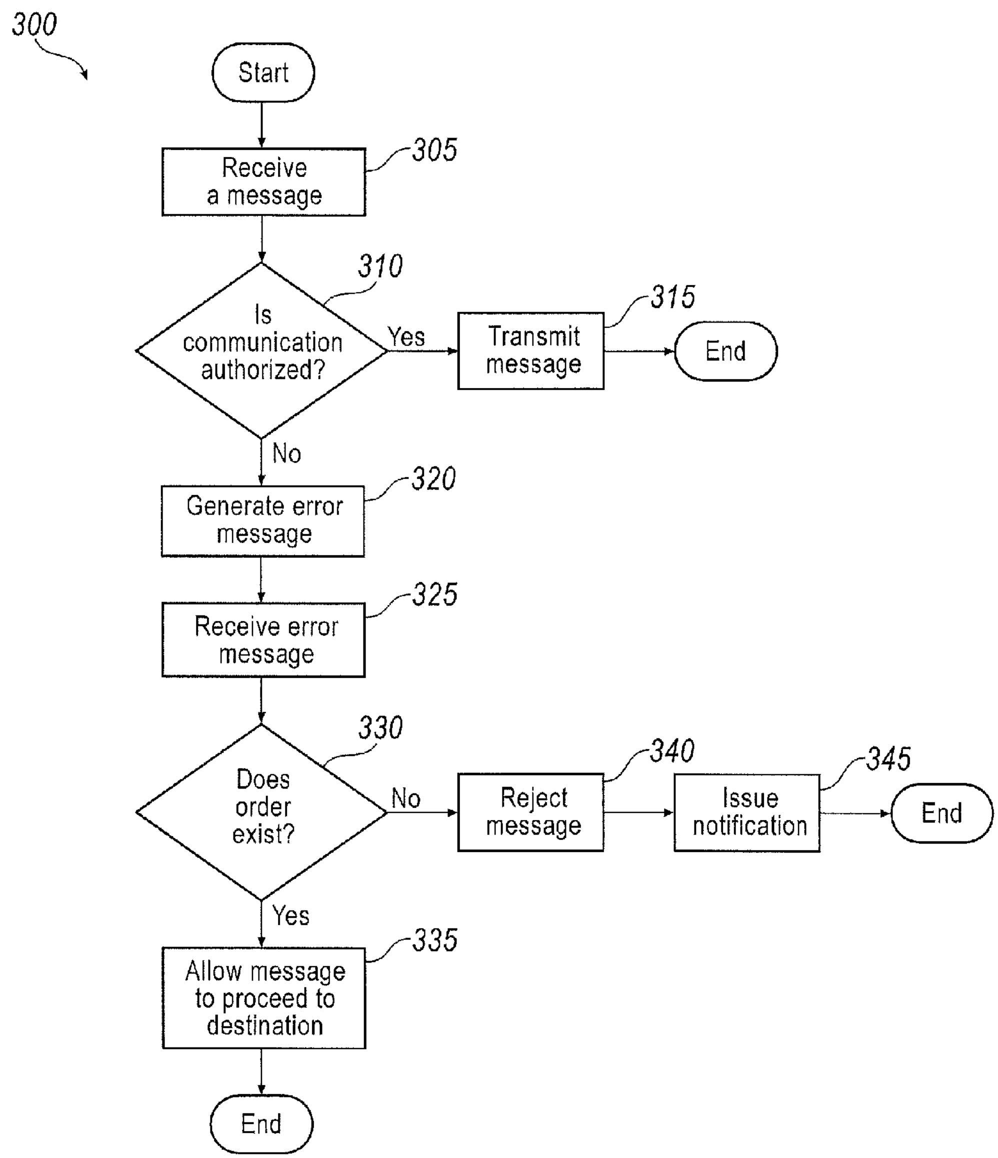
FIG. 3 illustrates an exemplary flowchart of a method that may be implemented by the system of FIGS. 1 and 2.

FIG. 3 illustrates an exemplary flowchart of a method 300 that may be implemented by the system of FIGS. 1 and 2.

Block 305 includes receiving a message. For example, the first signal transfer point 205 may receive a message from the second signal transfer point 210. The message may be communicated along one of the B links in the system.

Decision point 310 includes determining whether the communication between the first signal transfer point 205 and the second signal transfer point 210 is authorized. For example, the first signal transfer point 205, upon receiving the message, may screen the message by analyzing the point code of the second signal transfer point 210. The first signal transfer point 205 may be configured to allow communication with the second signal transfer point 210 based on the second point code identifying the second signal transfer point 210. Alternatively, the signal transfer point may query the order system 135 to determine whether any processed orders exist allowing communication from the second signal transfer point 210 to the first signal transfer point 205 based on, for example, the second signal point code.

If communication with the second signal transfer point 210 is authorized, the method 300 moves to block 315, which includes transmitting the message to the signal end point 125 designated in the message, and the method 300 ends.

If communication with the second signal transfer point 210 is not authorized, the method 300 moves to block 320, which includes generating an error message. The error message may include the first point code and the second point code, as well as other information about the communication. Moreover, the error message may be generated in a predetermined format, such as a hexadecimal format.

Block 325 includes receiving the error message from the first signal transfer point 205 at, for example, the monitoring system 130. In one exemplary approach, the monitoring system 130 receives the error message in a hexadecimal format. Therefore, the monitoring system 130 may convert the error message to another format, such as a decimal format, to make the point codes identified by the error message more readable to a user.

Decision point 330 includes determining whether an order authorizing communication between the first signal transfer point 205 and the second signal transfer point 210 is stored in the order system 135. For example, the order may exist, but the order system 135 may not have processed the order yet, making it unavailable to the first signal transfer point 205 and causing the signal transfer point to generate the error message in step 320. In one exemplary approach, the monitoring system 130 may query the order system 135 for all orders, pending or processed, that allow communication between the first and second point codes. If any orders match the query, the monitoring system 130 may be configured to determine whether the message sent to the first signal transfer point 205 from the second signal transfer point 210 is authorized, despite the lack of a processed order. For example, if a pending order matches the search criteria, the monitoring system 130 may be configured to determine whether that pending order authorizes the communication. If so, the method 300 allows the message to proceed to its destination (e.g., the signaling end point 125) as represented by block 335 and the method 300 ends.

If no pending orders authorize the communication, the method 300 moves to block 340, which includes rejecting the message. In one exemplary approach, the message is simply discarded. Alternatively, the monitoring system 130 may issue a notification as indicated by block 345. For example, the monitoring system 130, upon determining that the communication is not authorized, may generate a notification documenting the unauthorized communication and transmit the notification to a first administrator of the first service provider's network 105, to a second administrator of the second service provider's network 110, or both. With the notification, the first and second administrators may determine whether an order should be entered into the order system 135 allowing communication between the first and second signal transfer point 205, 210. The method 300 may end after block 345.

Figure 4:
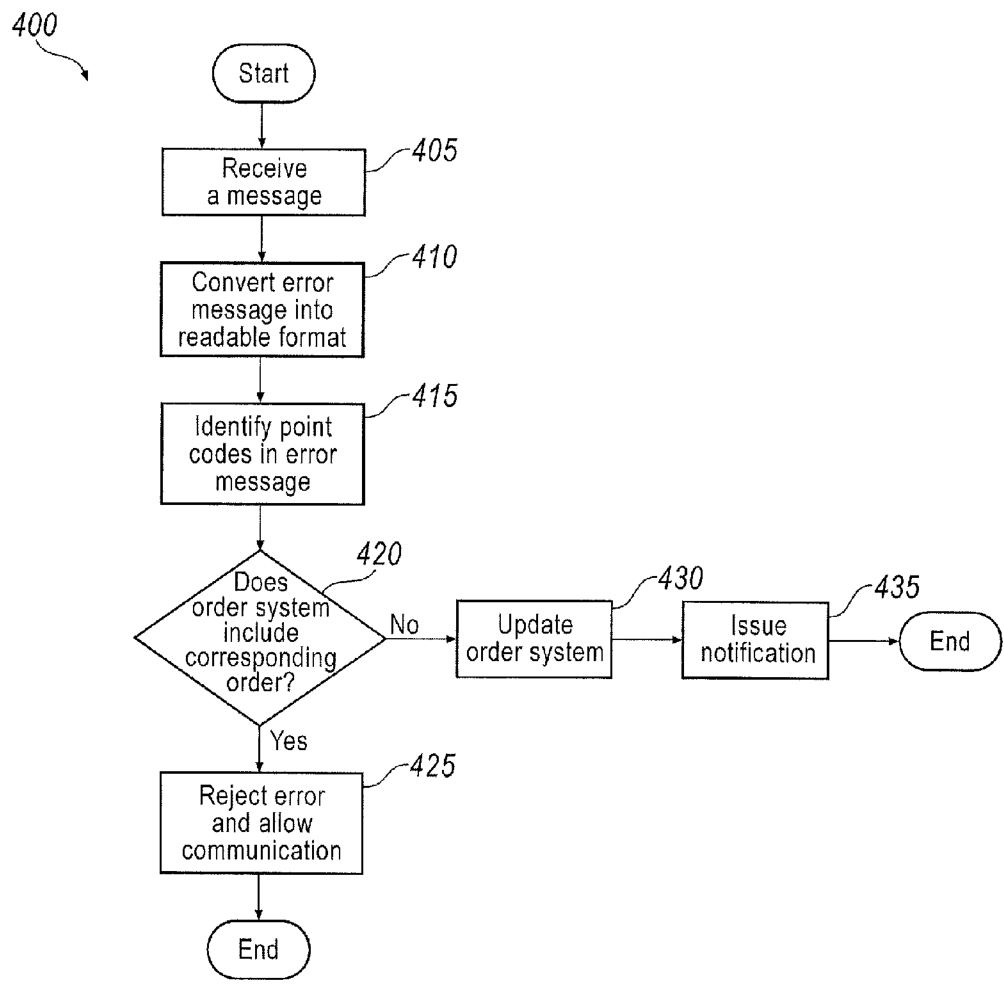
FIG. 4 illustrates an exemplary flowchart of a method that may be implemented by the monitoring system.

FIG. 4 illustrates an exemplary flowchart of a method 400 that may be implemented by the monitoring system 130. For example, the monitoring system 130 may include a computer-readable medium that tangibly embodies computer-executable instructions to carry out the method 400.

Block 405 may include receiving the error message generated by the first signal transfer point 205. The error message may indicate that communication between the first signal transfer point 205 and the second signal transfer point 210 is not authorized.

Block 410 may include converting the error message into a readable format. For example, the first signal transfer point 205 may generate the error message in a hexadecimal format, and the monitoring system 130 may be configured to convert the error message to a decimal format.

Block 415 may include identifying the first point code corresponding to the first signal transfer point 205 and the second point code corresponding to the second signal transfer point 210 from the error message. For example, the monitoring system 130 may be configured to recognize point codes based on characteristics or properties of the point code. For example, if the point code is a nine-digit number, the monitoring system 130 may be configured to recognize nine-digit numbers as point codes. Furthermore, each point code may be tagged with a field indicating whether the point code is a destination point code (e.g., indicating the signal transfer point to which the message was sent) or an origination point code (e.g., indicating the signal transfer point that transmitted the message).

Decision point 420 may include determining whether the order system 135 includes an order that authorizes communication between the first and second signal transfer point 205, 210. For example, the monitoring system 130 may be configured to query the order system 135 for orders that correspond to the error message (e.g., authorize the communication despite the error message). In one exemplary approach, the monitoring system 130 may be configured to query the order system 135 for all orders that authorize communication between the first signal transfer point 205 and the second signal transfer point 210. The monitoring system 130 may identify relevant orders based on the presence of the first point code and the second point code.

If an order authorizing communication exists, the error may be rejected and the communication between the first signal transfer point 205 and the second signal transfer point 210 as indicated by block 425. Once communication is allowed, the method 400 may end.

If no orders authorizing communication exist, the order system 135 may be updated as shown at block 430. For example, the monitoring system 130 may generate a temporary order to be reviewed or approved by an administrator of the first or second service provider.

Block 435, following block 430, may include issuing a notification to the administrator. For example, the notification may invite the administrator of either the first or second service provider networks 105,110, or both, to investigate the error message and the failed communication and determine whether the communication should have been authorized. The method 400 may end after block 435.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The invention claimed is:

1. A system comprising:

a first signal transfer point configured to communicate with a second signal transfer point via a communication network, wherein said first signal transfer point is configured to determine whether a communication received from said second signal transfer point is authorized, and if not, generate an error message;

a monitoring system in communication with said first signal transfer point; and an order system in communication with said monitoring system, wherein said order system is configured to store pending orders authorizing communication between said first signal transfer point and said second signal transfer point, and wherein said monitoring system includes a computing device configured to receive the error message generated by said first signal transfer point, query said order system to determine whether a pending order authorizing the communication between said first signal transfer point and said second signal transfer point exists, and reject the error message to allow the communication from said second signal transfer point to said first signal transfer point if the pending order authorizing the communication exists in the order system, and to reject the error message, said monitoring device is configured to transmit a notification to said first signal transfer point indicating that the communication from said second signal transfer point has been authorized.

2. A system as set forth in claim 1, wherein:

said first signal transfer point includes a first point code that is unique to said first signal transfer point, said second signal transfer point includes a second point code that is unique to said second signal transfer point, and the error message generated by said first signal transfer point includes the first point code and the second point code.

3. A system as set forth in claim 2, wherein said monitoring system is configured to determine whether an order authorizing the communication between said first signal transfer point and said second signal transfer point by querying said order system for orders that include the first point code and the second point code.

4. A system as set forth in claim 1, wherein said first signal transfer point is configured to screen messages from said second signal transfer point to determine whether the message from said second signal transfer point is authorized.

5. A system as set forth in claim 1, wherein said monitoring system is configured to receive the error message from said first signal transfer point in a hexadecimal format and convert the error message to a decimal format.

6. A system as set forth in claim 1, wherein:

said first signal transfer point is paired with a third signal transfer point in communication with the second signal transfer point over the communication network, and said second signal transfer point is paired with a fourth signal transfer point in communication with said first signal transfer point and said third signal transfer point over the communication network.

7. A method comprising:

receiving a message at a first signal transfer point, the message being transmitted from a second signal transfer point;

determining at the first signal transfer point whether communication between the first signal transfer point and the second signal transfer point is authorized;

generating an error message at the first signal transfer point if the communication with the second signal transfer point is unauthorized;

receiving, at a monitoring system, the error message from the first signal transfer point;

determining, via the monitoring system, whether a pending order authorizing communication between the first signal transfer point and the second signal transfer point is stored in an order system; and if the pending order authorizing communication exists in the order system, rejecting the error message via the monitoring system to allow the communication to said first signal transfer point from said second signal transfer point, wherein rejecting the message includes transmitting a notification to the first signal transfer point indicating that the communication from the second signal transfer point has been authorized.

8. A method as set forth in claim 7, wherein the first signal transfer point includes a first point code and the second signal transfer point includes a second point code, and wherein determining whether an order authorizing communication between the first signal transfer point and the second signal transfer point is stored in the order system includes querying the order system for orders that include the first point code and the second point code.

9. A method as set forth in claim 7, wherein determining whether communication between the first signal transfer point and the second signal transfer point is authorized includes screening the message transmitted from the second signal transfer point to the first signal transfer point.

10. A method as set forth in claim 7, wherein receiving the error message from the first signal transfer point includes receiving the error message in a hexadecimal format.

11. A method as set forth in claim 10, further comprising converting the error message to a decimal format.

12. A method as set forth in claim 7, further comprising generating a temporary order authorizing the communication between the first signal transfer point and the second signal transfer point.

13. A non-transitory computer-readable medium tangibly embodying computer-executable instructions for causing a processor to perform operations comprising:

receiving an error message generated by a first signal transfer point indicating unauthorized communication between the first signal transfer point and a second signal transfer point;

querying an order system for pending orders that correspond to the error message and authorize communication between the first signal transfer point and the second signal transfer point; and rejecting the error message generated by the first signal transfer point if a pending order authorizing the communication exists by transmitting a notification to the first signal transfer point indicating that the communication from the second signal transfer point has been authorized, wherein querying the order system includes querying the order system for pending orders that include the first point code and the second point code.

14. A non-transitory computer-readable medium as set forth in claim 13, the operations further comprising identifying a first point code corresponding to the first signal transfer point and a second point code corresponding to the second signal transfer point from the error message.

15. A non-transitory computer-readable medium as set forth in claim 13, the operations further comprising converting the error message from a hexadecimal format to a decimal format.

16. A non-transitory computer-readable medium as set forth in claim 13, the operations further comprising updating the order system to include a temporary order authorizing the communication between the first signal transfer point and the second signal transfer point.

17. A system as set forth in claim 1, wherein the first and second signal transfer points are associated with different service provider networks.

18. A system as set forth in claim 1, wherein the monitoring system is configured to receive the error message from the first signal transfer point as part of a batch process.

19. A system as set forth in claim 1, wherein the monitoring system is configured to reject the communication from the second signal transfer point if no pending order authorizing the communication exists in the order system by discarding the communication or transmitting a notification to said first signal transfer point indicating that the communication is prohibited.

20. A system as set forth in claim 1, wherein the monitoring system is configured to generate a temporary order if no pending orders authorizing the communication from the second signal transfer point exist in the order system, the temporary order authorizing future communications from the second signal transfer point to the first signal transfer point.

* * * * *